(No Model.)
O. B. SHALLENBERGER.
PHASE ADJUSTING METHOD AND MEANS FOR ALTERNATING CURRENT APPARATUS.
No. 591,240.  Patented Oct. 5, 1897.
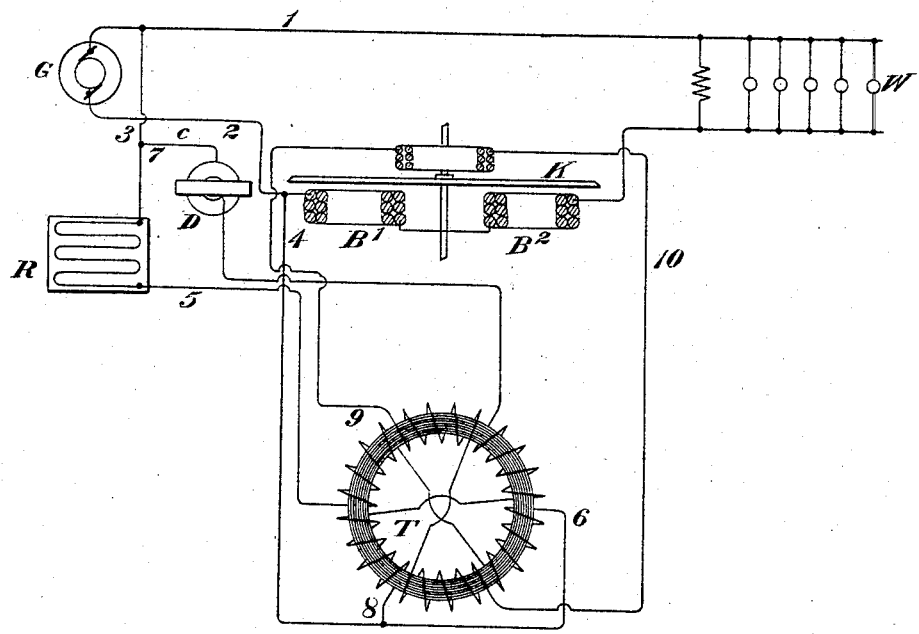
WITNESSES
Ethan D. Dodds
Hubert C. Tener
INVENTOR
Oliver B. Shallenberger
BY Wesley G. Carr
Associate ATTORNEY.

UNITED STATES PATENT OFFICE.

OLIVER B. SHALLENBERGER, OF ROCHESTER, PENNSYLVANIA.

PHASE-ADJUSTING METHOD AND MEANS FOR ALTERNATING-CURRENT APPARATUS.

SPECIFICATION forming part of Letters Patent No. 591,240, dated October 5, 1897.

Application filed January 9, 1897. Serial No. 618,537. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Phase-Adjusting Methods and Means for Alternating-Current Apparatus, (Case No. 727,) of which the following is a specification.

My invention relates to apparatus for the utilization of alternating currents, and more particularly such apparatus as involves the use of alternating magnetic fields differing in phase.

It is particularly applicable to instruments for indicating, measuring, or recording the energy of alternating currents, and I will describe it principally with reference to such use, although I do not limit myself to any particular application of the novel features of my invention. It is well known that an alternating current may be caused to lag behind the impressed electromotive force which produces it by the introduction into the circuit of a coil possessing more or less self-induction. The magnetic field in the neighborhood of a conductor carrying such a current lags to a corresponding degree, but the lag is limited under practical conditions to an amount somewhat less than a quarter period—that is, ninety degrees, as commonly represented. By the use of my invention it is possible to greatly augment the angular displacement of the magnetic field from the impressed electromotive force, so that by its use in connection with a self-induction coil, as above stated, or an equivalent device, any desired phase-angle may be obtained within wide limits. I employ it usually in connection with coils possessing a high coefficient of self-induction where it is desired to obtain a magnetic field as nearly as possible in quadrature with the impressed electromotive force, or with another magnetic field having a definite phase relation to the impressed electromotive force. I have described the use of this principle in connection with certain measuring instruments in patents granted me on January 1, 1895, and numbered 531,867, 531,868, and 531,870, and it is therefore unnecessary to describe specifically herein all the modifications and the detailed construction of such apparatus. In Patent No. 531,867 I have described the use of an inductance-coil for producing in a shunt-circuit connected with a main circuit carrying a single-phase current a current which lags approximately ninety degrees in phase behind the impressed electromotive force, but it is difficult in practice to produce this exact degree of lag by the use of an inductance-coil alone, and in Patent No. 548,231, granted to me October 22, 1895, I have described a method of and means for modifying or supplementing the action of the inductance-coil, so as to produce the exact degree of lag required.

My present invention relates to a method of and means for producing this last-mentioned result differing from those described in my said Patent No. 548,231, and which have certain advantages over them.

My invention may be more readily understood by reference to the accompanying drawing, in which the organization of the apparatus is indicated diagrammatically. The drawing is to be regarded as indicating in a general way the application of my invention to an electrical measuring instrument or any apparatus requiring the phase relations hereinbefore mentioned.

G represents a suitable source of alternating currents conveyed by the conductors 1 2 to the work-circuit W. In series with the conductor 2 are connected the coils B' B², which constitute field-coils of the apparatus. A single coil or more than two may be used in place of the two coils B' and B².

T is a transformer in which there are two primary circuits, one of which, 5 6, is connected in series with a non-inductive resistance R, and the other of which, 7 8, is connected in series with an inductive resistance D. These two primary circuits are connected in multiple arc to each other and to the conductors 1 2 by means of the conductors 3 4. The transformer T is here represented as of the ring type, and the two primary circuits which, owing to the use in them of the resistance R and the inductance-coil D, convey currents differing in phase are so connected as to produce a rotating field in a manner well understood. The secondary circuit of the transformer is connected to the conductors 9 10, and by suitably locating the secondary coils with reference to the primary coils as regards angular position any desired phase relation between the secondary current and the primary electromotive force may be obtained. The coil A is connected with the secondary circuit 9 10 and constitutes one of the field-coils of the apparatus. The field-coils A and B' B² are arranged as described in my previous patent, already referred to, so as to produce a shifting field, and K is an armature, here shown in the form of a disk, which is in inductive relation to the field so produced, so as to be rotated or moved thereby.

When the invention is used in connection with measuring instruments, the angular position of the secondary coil of the transformer is so adjusted as to produce in the secondary circuit a current differing ninety degrees in phase from the primary electromotive force for the purposes set forth in my previous patents, already referred to; but it is obvious that the invention may be used to produce any other definite phase relation that may be desired between the secondary current and the primary electromotive force.

In constructing the apparatus the parts should be so proportioned that the phase-angles of the two primary circuits are not affected to any considerable extent by the reaction of the primary coils of the transformer.

The construction of the inductance-coil D is preferably that which has been fully described in my previous patents above referred to, but by the use of my present invention other and less efficient forms of inductance-coil may be employed with satisfactory results.

The phase-angle of the secondary current may be adjusted or varied by varying the resistance R or the inductance-coil D and by varying the number of turns or the angular position of the primary coils, as well as by varying the angular position of the secondary coil. In practice it will be found convenient to construct the transformer so as to secure as approximately as practicable in ordinary manufacturing work the phase relation desired and to effect the final adjustment by varying the resistance R.

It is not essential that the transformer shall be of the rotating-field type here shown, this form having been shown merely for the purpose of illustration. Any suitable transformer or combination of transformers in which two primaries produce a resultant effect in a single secondary circuit may be used in place of the particular type of transformer shown.

In certain cases where the electromotive force or the periodicity is sufficiently high a condenser may be used in place of the resistance R to increase the difference in phase between the currents in the primary coils.

I claim as my invention—

1. The combination with a field-coil supplied with an alternating current, of a second field-coil and a transformer having a secondary circuit including the said second field-coil and inductively influenced by two primary circuits connected to the source supplying the said first field-coil by circuits having different coefficients of self-induction, substantially as described.

2. The combination with a field-coil supplied with an alternating current, of a second field-coil and a transformer having a secondary circuit including the said second field-coil and inductively influenced by two primary circuits connected to the source supplying the said first field-coil by circuits having different coefficients of self-induction, the said secondary circuit and primary circuits being so adjusted and arranged as to produce a current in the secondary in quadrature with the primary electromotive force, substantially as described.

3. The combination of an armature, two field-coils in inductive relation thereto, an alternating-current circuit connected with one of said field-coils, a transformer having two primary circuits of different coefficients of self-induction connected with said alternating-current circuit, and a secondary connected with the other of said field-coils, substantially as described.

4. The combination, in an electrical measuring instrument of an armature, two field-coils so combined as to produce a shifting field in inductive relation thereto, an alternating-current circuit connected with one of said field-coils, a transformer having two primary circuits of different coefficients of self-induction connected with said alternating-current circuit and a secondary connected with the other of the said field-coils, the said secondary circuit and primary circuits being so adjusted and arranged as to produce a current in the secondary circuit which is in quadrature with the primary electromotive force, substantially as described.

5. The method hereinbefore described of producing an alternating current in quadrature with the impressed electromotive force which consists in lagging a derived current, inducing a secondary current by means of such lagged current and modifying the phase-angle of the secondary current by the inductive influence of a second derived current substantially in phase with the impressed electromotive force.

In testimony whereof I have hereunto subscribed my name this 28th day of December, 1896.

OLIVER B. SHALLENBERGER.

Witnesses:
LEONARD E. CURTIS,
RALPH D. MERSHON.